US005409342A

United States Patent [19]
Galli

[11] Patent Number: 5,409,342
[45] Date of Patent: Apr. 25, 1995

[54] WIRELESS AUTOMATED COMPUTER-CONTROLLED STORING AND ARTICLES TRANSPORTING SYSTEM

[75] Inventor: Dino Galli, Como, Italy

[73] Assignee: I.A.S. Industrial Automation Systems S.A.S. Di Dino Galli & C., Como, Italy

[21] Appl. No.: 71,386

[22] Filed: Jun. 2, 1993

[30] Foreign Application Priority Data

Jun. 5, 1992 [IT] Italy .............. MI92A01410

[51] Int. Cl.⁶ ............................................. B65G 1/127
[52] U.S. Cl. ..................................... 414/21; 414/273; 282/787
[58] Field of Search ............... 414/222, 273, 331, 21, 414/280–282, 787; 364/478

[56] References Cited

U.S. PATENT DOCUMENTS

| | | | |
|---|---|---|---|
| 3,796,327 | 3/1974 | Meyer et al. | 414/222 |
| 4,388,033 | 6/1983 | Pipes | 414/282 |
| 4,538,950 | 9/1985 | Shiomi et al. | 414/222 |
| 4,566,837 | 1/1986 | Shiomi et al. | 414/222 |
| 4,773,810 | 9/1988 | Nishimura et al. | 414/331 |
| 4,801,236 | 1/1989 | Katzenschwarz | 414/787 X |
| 4,869,639 | 9/1989 | Wikström | 414/21 X |
| 4,921,087 | 5/1990 | Nakamura | 414/273 X |
| 4,998,857 | 3/1991 | Paravella et al. | 414/21 X |
| 5,113,349 | 5/1992 | Nakamura et al. | 414/273 X |
| 5,135,344 | 8/1992 | Kita et al. | 414/273 |
| 5,274,984 | 1/1994 | Fukuda | 414/331 X |

FOREIGN PATENT DOCUMENTS

| | | | |
|---|---|---|---|
| 1224425 | 7/1987 | Canada | 414/280 |
| 0110547 | 6/1984 | European Pat. Off. | |
| 247524 | 12/1987 | European Pat. Off. | 414/280 |
| 0458722 | 11/1991 | European Pat. Off. | |
| 1394414 | 6/1963 | France | 414/281 |
| 3632448 | 4/1988 | Germany | |
| 262701 | 12/1985 | Japan | 414/331 |
| 152898 | 6/1990 | Japan | 414/273 |
| 2174686 | 11/1986 | United Kingdom | 414/281 |
| 8701538 | 3/1987 | WIPO | 414/273 |

*Primary Examiner*—David A. Bucci
*Attorney, Agent, or Firm*—Young & Thompson

[57] ABSTRACT

An automated system for loading, unloading and storing articles from a rotary store, and for transporting them into a work area by a self-powered trolley vehicle provided with gripping members; the self-powered vehicle and the rotary store (10) are each provided with interactive computer units which can communicate with each other by a wireless connecting system comprising directional data receiving and transmitting units to provide the computer unit of the rotary store with article storing data received by the computer unit of the self-powered vehicle from a central control unit.

5 Claims, 3 Drawing Sheets

WIRELESS AUTOMATED COMPUTER-CONTROLLED STORING AND ARTICLES TRANSPORTING SYSTEM

BACKGROUND OF THE INVENTION

The present invention relates to a wireless computer controlled system for automatically loading and unloading articles from a store unit, and for transporting them into a work area, by means of which it is possible to programmably control the operation of store and of computer controlled self-powered vehicles or trolleys to fully free the system from the need for intervention by any operator.

The automated operation of large store units by means of computerised systems, provided with automatic loading and unloading devices, is in itself known and in use from many time. These automatic store units, both from the structural and from their operational point of view, have nevertheless been designed and constructed as functionally independent systems which cannot be integrated with modern production processes requiring automatic operations integrated with services and other functions on which they generally depend.

Current automated stores are therefore composed of large structures located in isolated areas, often far from the work areas, so that they require conveying systems for moving materials or articles from a store unit to a working area or machine tool. Automated store units and conveying systems using computer-controlled and self-powered vehicles moving along a travelling path are known for example from GB-A- 2,174,686 or U.S. Pat. No. 4,538,950; nevertheless although the management of the store unit and running of conveying vehicles may be controlled by a central processing unit, they require large storing areas and do not allow to change or modify the working program of the storage unit, unless from the central unit, to adapt to working requirements each time they occur. Therefore a complex and costly wire system is required for connecting and transmitting separate program data from the central control unit, to the store units to the vehicles and to the working points. U.S. Pat. No. 4,669,047 suggest the use of computer-controlled, self-powered vehicles provided with loading means for an automated supply system, in which storage modules are used as passive back-up supply source movable on the same transporting vehicles of the system; no possibility exist to actively and independently modify the management program of the storage modules by an operator, unless from a central control unit.

Rotary stores are also know which advantageously comprise a rack type supporting structure, small in size, suitable for being placed inside a work area to be served. Although management of these stores is both generally automated and linked to a specific software, it nevertheless requires the intervention of an operator for loading and unloading articles or objects stored, which have to be removed or stored manually or by mechanical means actuated in any way by an operator, who each time must cause the rotation of the rack to select the required shelf, acting on a control keyboard on the same store unit.

From EP-A-110547 it is known a handling and storage system suitable for operating, in an integrated manner, with a transport system inside a work area.

According to this document self-powered vehicles are travelling around a tracking network to stop near a vertically extending storing rack; the rack storing device is computer-controlled to rotate and to stop selected shelves at the same level as a programmed vehicle arrives at the particular storage location. The vehicle is provided with a pick-up device to load or unload articles from the selected shelf. This arrangement therefore comprises different parts which co-operate with each other, but which are separately controlled to select and to gain access to a particular storing area of the store unit; therefore a central program unit must separately feed co-related program data to the vehicle and to the storage unit by suitable wire connections or network.

SUMMARY OF THE INVENTION

It would therefore be desirable to have a fully automated computer-control 1 ed transport and storage system for loading and unloading parts or objects to be transported, from a store unit, which do not require the intervention of any operator and which at the same time is compatible with any production process.

Therefore, the present invention is directed to an integrated system for storing, removing and transporting objects from rotary stores of the rack type in which the shelves of the store move along a vertically extending annular path, and in which the store may be managed by a remote control unit through a wireless connecting system making the store easily accessible for operations of loading and unloading which are performed automatically.

The present invention is furtherly directed to a system for storing, loading, unloading and transporting objects from rotary stores, whose running is extremely versatile and relatively low in cost compared to traditional storage systems.

The above can be obtained by means of a combined storage and transport system.

According to the invention therefore an integrated and programmable wireless system is provided for storing and moving objects under the control of a program central unit by which it is possible to dialogue with the on-board computer of the trolleys at one or more data entry stations provided in the work area, to repeatedly control and change time to time the program data of the trolleys and of the same store unit according to working needs.

BRIEF DESCRIPTION OF THE DRAWINGS

The present invention and a preferred embodiment thereof will be illustrated hereinunder with reference to the accompanying drawings, in which.

DESCRIPTION OF THE PREFERRED EMBODIMENTS

Figure 1:
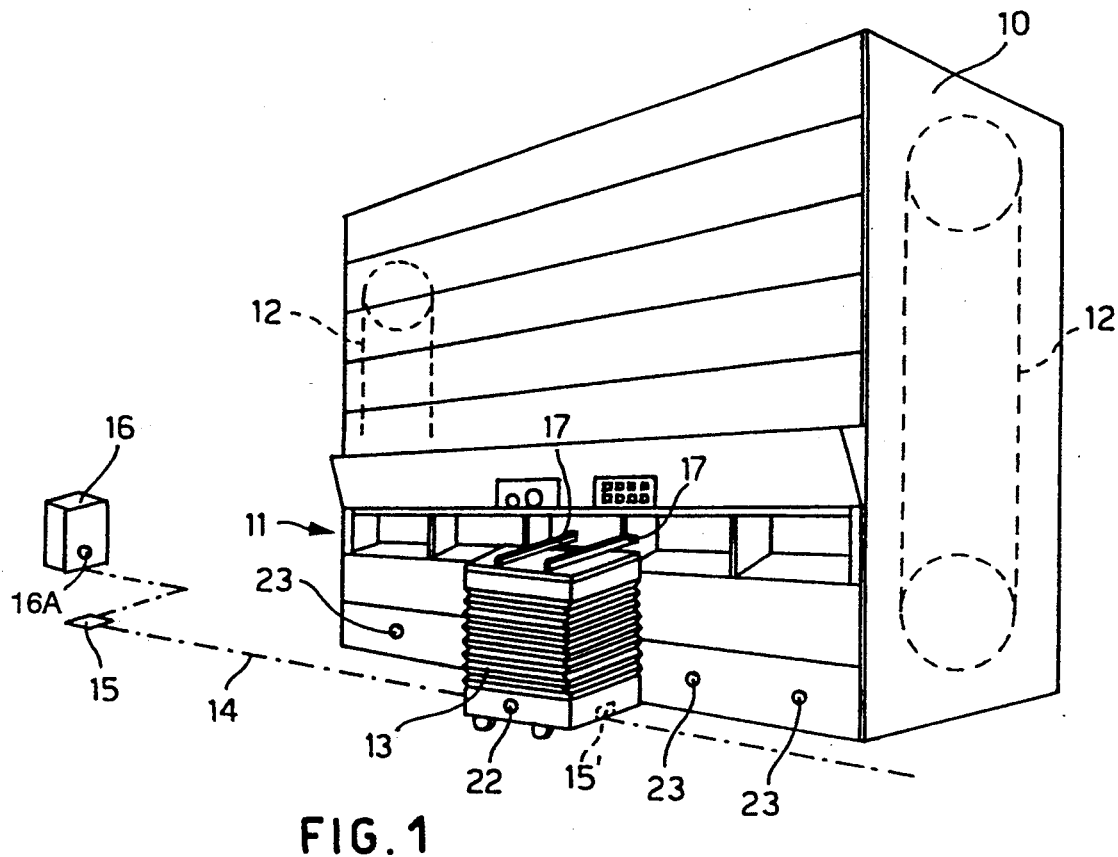
FIG. 1 is a front view of a rotary store, extending vertically, served and managed through self-powered trolleys according to the present invention.

Reference 10 in FIG. 1 denotes a rotary store provided with a plurality of shelves 11 having storing areas in which the shelves are hinged to endless chains appropriately driven to rotate by a drive motor, to move said shelves along an annular path which extends substantially upwards in a vertical direction. The store 10 is operated by a computer-controlled system, schematically represented in FIG. 2, in which storing data may be input manually by means of a keyboard or automatically by means of a programmable on-board computer of a self-powered trolley 13, as explained hereinunder, and in which it is possible to bring any one of the shelves 11 into an appropriate loading and unloading position which is accessible to the trolley at the front of the store, as represented schematically in FIG. 1.

Figure 3:
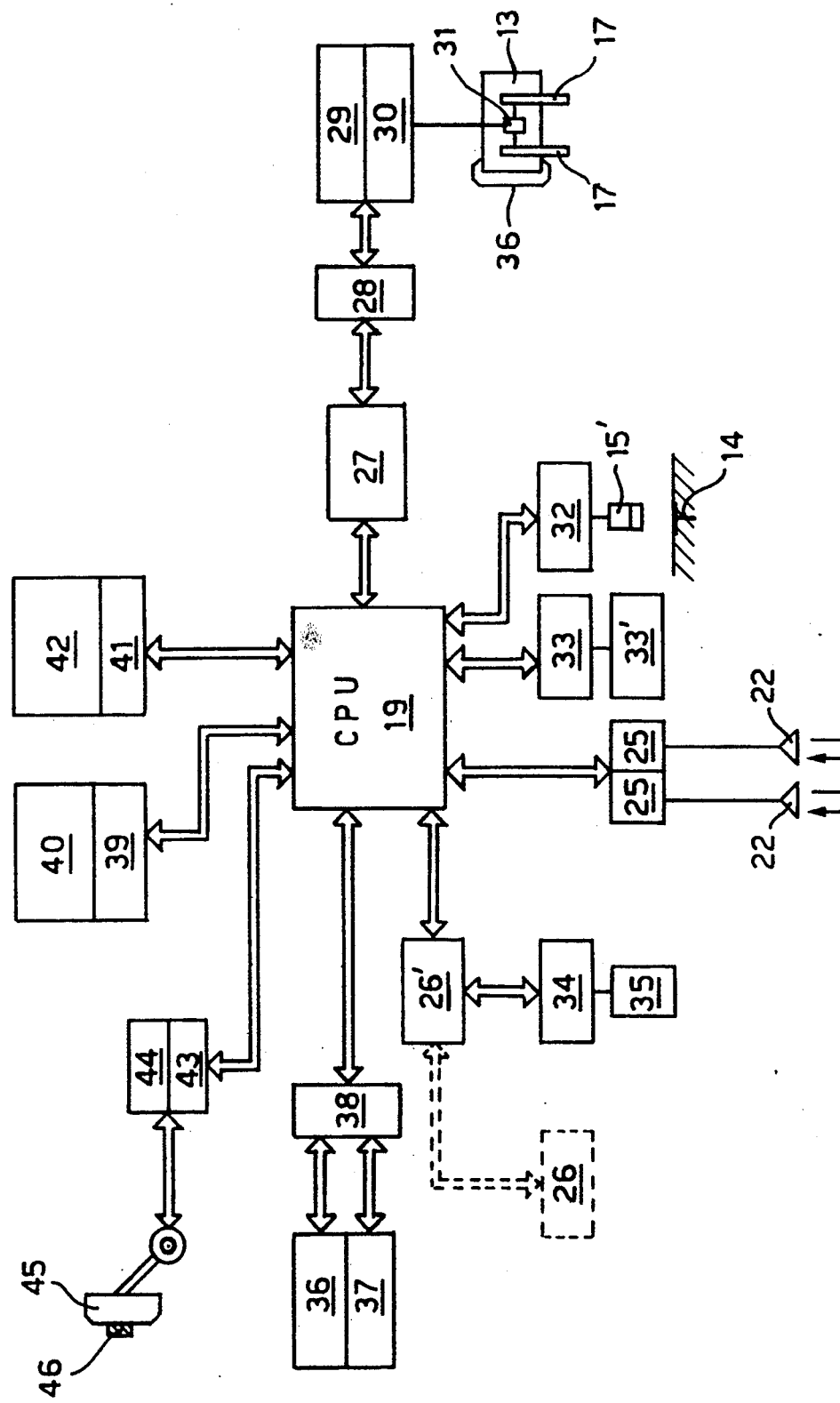
FIG. 3 is a block diagram illustrating the general functions of a computer-controlled system for running of self-powered trolleys having an on-board computer able to dialog with the computerised system of the store in FIG. 2.

As referred to above, the self-powered trolley 13 is provided with an on-board computer controlled system, schematically represented in FIG. 3, able to dialog with a central control unit 16 (FIG. 1) to receive storage data, respectively with the computer-control system of the store 10 to provide the same with programmed storing data received by a control unit through wireless connections comprising appropriate directional receiving and transmitting units 22, 23 and 16A, for example of infrared ray type, provided at predetermined positions frontally along a lower band of the store on the unit 16, and on one or both sides of the trolley 13 respectively, as shown.

The self-powered trolley 13, which may be of any suitable type, moves along a guide path 14 defined by a built-in electromagnetic track which extends inside a work area. Magnetic sensors 15' are provided on the trolley 13 to sense the track 14 and if necessary magnetic plates 15 provided for indicating reference positions for the trolley 13 along the path 14, to guide the same along its path.

Along the trolley guide path 14, dialog stations may also be provided by means of which the on-board computer 19 of the trolley 13 can communicate and dialog with the computer (not shown) of a central control unit 16 to receive orders and instructions which it must subsequently perform, as well as programmed storage data which must be provided to the computer 18 of the store.

The trolley 13 on its upper surface is provided with means for gripping articles, for example in the form of a pair of extendable and retractable forks 17, suitable for projecting inside the individual loading cells or storing areas of a shelf 11, in the open condition of the store 10, as shown schematically in FIG. 1. The trolley 13 may moreover be provided with other fittings, such as for example scales for weighing the articles transported, especially useful in preparing colouring agents in textile printing. The scales, with the forks, may if necessary be supported by the upper mobile table which can be raised and lowered automatically by a pantograph system, in itself known and not forming part of the present invention.

Figure 2:
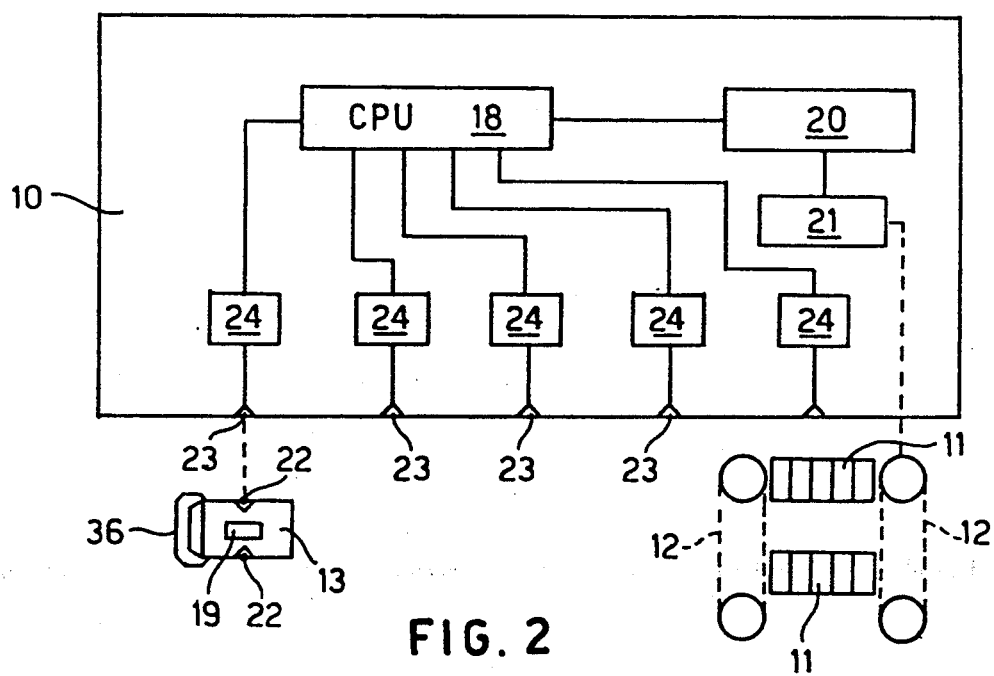
FIG. 2 is a schematic representation, of a computerised operative system for the store in FIG. 1, in combination with a self-powered trolley.

The computerised control system for the store as represented schematically in FIG. 2, comprises a CPU 18 which supervises all the control and drive functions. The CPU 18 must be able to dialog with corresponding CPU 19 for guiding and controlling the self-propelled trolley 13, via a suitable system for communicating and exchanging data and information.

The CPU 18 of the store 10, through an interface 20, for example an inverter, moreover controls a motor 21 for driving the endless chains 12 and shelves 11 of the store, in a manner programmed by the same CPU. As mentioned previously, the CPU 18 of the store must be able to dialog with a corresponding CPU 19 of the trolley 13, to receive from the latter program data provided by central unit 16. Therefore, the control systems, both of the trolley 13 of the central unit 16 and of the store 10, are provided with wireless intercommunication units, for example of the infrared ray type, which have at least one directional transceiver 22 on the trolley 13 connected to the CPU 19 as explained hereinunder, or a corresponding transceiver on the central unit 16, as well as a plurality of directional transceivers 23 aligned in parallel along the guide path 14 on the front side of the store at each position or storing area in which the trolley 13 must stop for the loading and unloading operations. Each receiving and transmitting device 23 consists for example of a photodiode connected to the CPU 18 via an ON/OFF communication card, able to convert the two light levels of the optical transducers 23 into corresponding voltage levels and vice versa; similarly for the transducers 22 of the self-powered trolley or central unit 16.

FIG. 3 of the drawings shows a logic diagram for the computerised system controlling the self-powered trolley 13, able to dialog and exchange data and instructions with the computerised systems of control unit 16 and the store 10.

More particularly, as shown in the abovementioned FIG. 3, the computerised system of the trolley comprises a CPU 19 connected to the various functional blocks of the system. The CPU 19 which supervises the control of all the functions of the self-powered trolley 13, communicates with the optical transducers 22 of the trolley via respective ON/OFF communication cards 25, similar to those of the store 10.

Correspondingly, the CPU is connected, by means of a control card 27 of the loading and unloading system of the trolley, to an interface 28, and to a supply circuit 29 and respectively an encoder or signal generator 30 which control the motor 31 for driving the forks 17.

To complete the computerised system for controlling the trolley 13, the CPU 19 is also connected to the following function blocks:

to the circuit 32 for guiding the trolley 13 which, via the magnetic sensor 15' senses the magnetic track 14;

to the circuit 33 for feeding the encoders and motors 33' of the carriage drive system;

to the circuit 34 for feeding the motor 35 of the system for guiding the directional wheels of the trolley;

to the scales 26, if provided, via the switching circuit 26';

to an anticollision strap 36 and to control photoelectric cells 37 via an interface 38;

to the circuit 39 for feeding the drive motor of the pantograph for raising the upper table of the trolley, and to the relative encoder or signal generator 40;

to the keyboard 41 and to the monitor 42 with which the self-propelled trolley 13 is normally provided; as well as to a card 43 for controlling the charge of the battery of accumulators 44 which feeds the entire electric system of the trolley and which, by means of brushes 45, may be connected to an external power supply 46.

In this way the trolley 13 forms part of a programmable storage and transport system, in which the trolley is totally independent from the functional point of view but integrated with the computerised control and operational system of the store 10, performing an interactive and programmable function.

Figure 4:
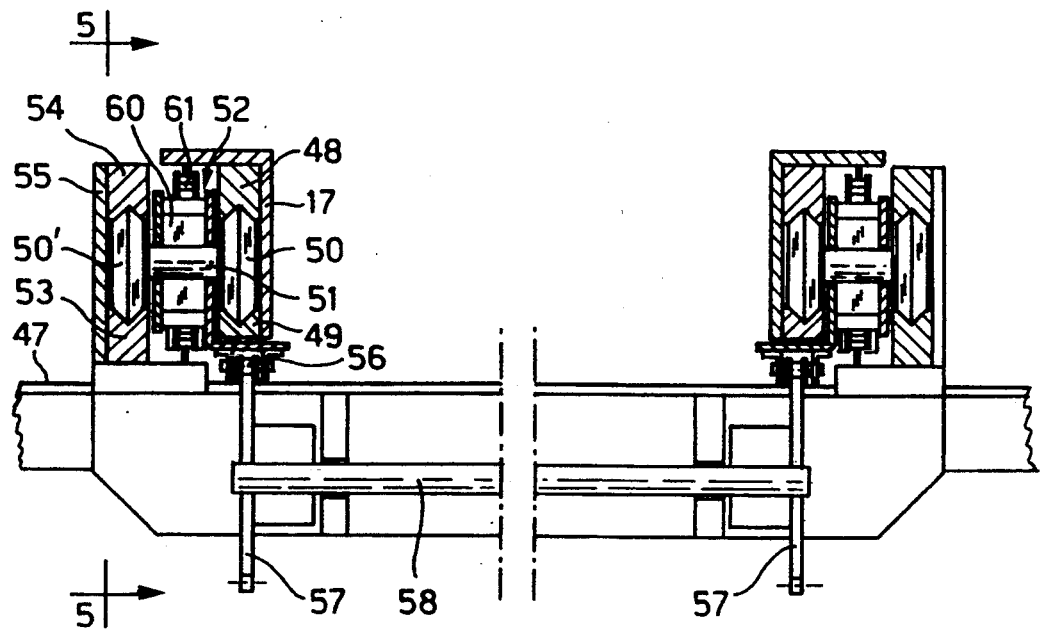
FIG. 4 is an enlarged cross sectional view of a preferred embodiment of automatic parts for removing objects from load cells of the store in FIG. 1.
Figure 5:
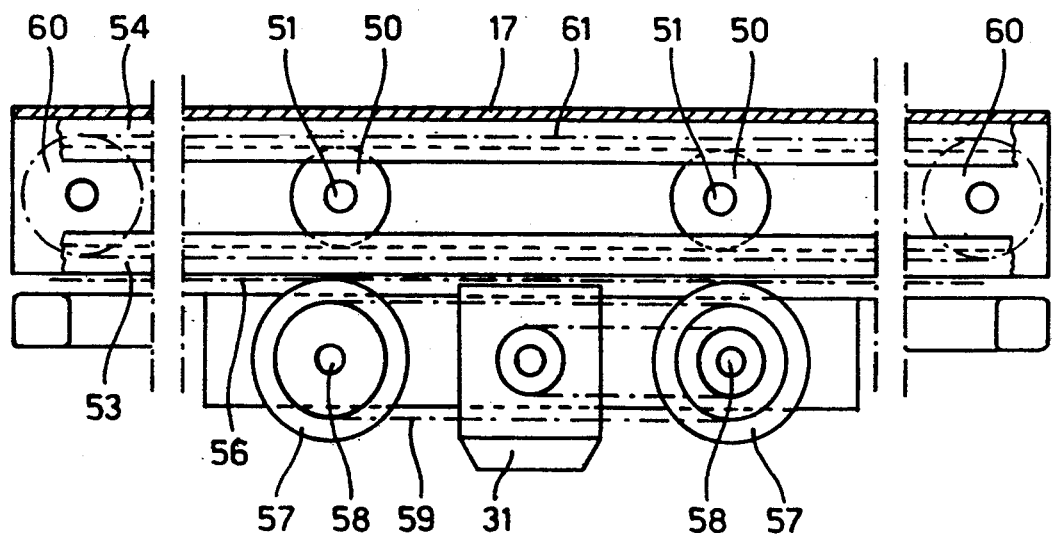
FIG. 5 is a longitudinal sectional view along line 5—5 of FIG. 4.

Referring now to FIGS. 4 and 5, we will describe a preferred, but not limitative, embodiment of a telescopic system for the fork members of the trolley.

As shown in said figures, the trolley is provided with a pair of fork members 17 which telescopically slide on suitable support guides, in turn sliding in relation to a table or plane 47 of the carriage.

More specifically, in the loading and unloading system shown, the forks 17 are attached to two opposite guides 48 and 49 which can slide along a set of double wheels 50, 50' whose axes 51 are supported by a mobile assembly 52 in the manner shown. Each mobile assembly 52 is composed of two metal sections crossed by the axes 51 of the wheels 50, 50'; the wheels 50' in turn slide along opposite guides 53, 54 attached by means of a plate 55 to the table 47 of the trolley. Longitudinally to each mobile assembly 52, on a lateral wing of one of the two sections, a mesh chain 56 is attached with which cogged wheels 57 engage, the latter being connected by means a coupling shafts 58 and a transmission 59 to the drive motor 31. The assembly of the cogged wheels 57 and the chains 56 form a sort of rack drive for the movable fork guide assemblies. Correspondingly each movable assembly 52 for guiding the forks drives the movement of the latter by means of cogged wheels 60 and an endless chain 61 which is attached on one side to the forks 17 and on the other side to the table 47 in central positions to the chains themselves.

In this way a telescopic movement is achieved of each fork 17 and of the relative movable guide assembly 52 which carries each fork 17 to accomplish sliding for a length double that of the guide assembly 52. Moreover the system described also allows bidirectional movement for the loading or unloading from both sides of the carriage 13.

From what has been described and shown in the accompanying drawings it is therefore clear that an integrated system is provided for storing, loading, unloading and transporting objects in general, by the combination of a rotary store, with a self-powered trolley, provided with wireless computerised control systems which can dialog one with the other to transmit data and information, in a fully integrated and programmable way according to specific work requirements. In this way a highly efficient and reliable storage and transport system, with extreme flexibility of use and relatively low costs, is accomplished.

Modifications of the invention herein disclosed will occur to a person skilled in the art and all such modifications are deemed to be within the scope of this invention as defined by the appended claims.

What is claimed is:

1. An automated system for transporting, loading, unloading and storing articles in a work area, the system comprising:
   computer-controlled storing means for storing articles, said storing means comprising shelf members movably supported along a vertical path, each of said shelf members defining storage areas arranged side by side;
   at least one computer-controlled self-powered vehicle for moving said articles between the storage areas of said storing means and delivering points along a traveling path having a portion thereof arranged in parallel to said storing means, said at least one self-powered vehicle comprising a programmable on-board computer;
   a central control unit along said path provided with traveling informations for said at least one self-powered vehicle and storage data for storing and removing articles from the storage areas of selected ones of said shelves, said on-board computer of said at least one self-powered vehicle being programmable with said traveling informations and said storage data from said central control unit;
   a computerized control system for said storing means, said computerized control system being programmable with storage data and controlled by said on-board computer of said at least one self-powered vehicle; and
   an optical communication system for transferring data and communications between said central control unit and said on-board computer of said at least one self-powered vehicle and for transferring data and communications between said on-board computer and said computerized control system of said storing means, said optical communication system comprising light emitting and detecting devices on said central control unit, on said at least one self-powered vehicle, and at stop positions of said at least one self-powered vehicle along said traveling path, said stop positions corresponding to said storage areas on the shelf members of said storing means, said optical communication system allowing a data and communications transfer only when said self-powered vehicle is positioned in front of one of said central control unit and said stop positions, said self-powered vehicle moving independently of said central control unit at intermediate points in said travelling path.

2. An automated system for transporting, loading, unloading and storing and moving articles in a work area according to claim 1 wherein said at least one self-powered vehicle comprises article gripping means and control means operatively connected to the on-board computer of said at least one self-powered vehicle to control a programmed movement of said gripping means between a retracted position on said self-powered vehicle and an advanced position within a selected area of a shelf member of said storing means.

3. An automated system according to claim 2, wherein said at least one self-powered vehicle comprises a scale unit for weighing loaded articles gripped by said gripping means and for storing weight data in said on-board computer of said at least one self-powered vehicle.

4. An automated system according to claim 3, wherein said gripping means comprise telescopically extending fork members, each of said fork members being slidingly supported by a movable guide assembly, said guide assembly being supported on said at least one self-powered vehicle by opposed guide members, said fork members being driven by motor drive means provided between each of said fork members and said guide assembly.

5. An automated system according to claim 4, wherein said motor drive means comprise a rack member between each guide assembly of said fork members, a drive motor, and a flexible annular transmission member, said flexible annular transmission member extending parallely to said guide assembly and connecting said fork members and interengaging cogged wheels on said guide assembly.

* * * * *